United States Patent
Jang (10) Patent No.: US 11,402,835 B2
(45) Date of Patent: Aug. 2, 2022

(54) RADIO-CONTROLLED SEED PLANTER

(71) Applicant: JANG AUTOMATION CO., LTD., Cheongju-si (KR)

(72) Inventor: Jae Su Jang, Cheongju-si (KR)

(73) Assignee: JANG AUTOMATION CO., LTD., Cheongju-si (KR)

( * ) Notice: Subject to any disclaimer, the term of this patent is extended or adjusted under 35 U.S.C. 154(b) by 493 days.

(21) Appl. No.: 16/536,740

(22) Filed: Aug. 9, 2019

(65) Prior Publication Data
US 2020/0174467 A1   Jun. 4, 2020

(30) Foreign Application Priority Data
Nov. 30, 2018   (KR) .................... 10-2018-0151543

(51) Int. Cl.
| | |
|---|---|
| *G05D 1/00* | (2006.01) |
| *A01C 7/20* | (2006.01) |
| *A01C 7/08* | (2006.01) |
| *G01S 19/01* | (2010.01) |

(52) U.S. Cl.
CPC ............. *G05D 1/0022* (2013.01); *A01C 7/08* (2013.01); *A01C 7/20* (2013.01); *G01S 19/01* (2013.01)

(58) Field of Classification Search
CPC ...... G05D 1/0022; G05D 1/0011; A01C 7/08; A01C 7/20; A01C 19/04; A01C 5/068; A01C 21/005; A01C 7/127; A01C 15/007; A01C 5/062; A01C 5/066; A01C 7/085; A01C 15/006; G01S 19/01; B60K 7/0007; B60K 2007/0038; B60R 16/04; Y02P 60/00
See application file for complete search history.

(56) References Cited

U.S. PATENT DOCUMENTS

| | | | |
|---|---|---|---|
| 2017/0227969 A1* | 8/2017 | Murray | .................. A01C 21/00 |
| 2018/0338405 A1* | 11/2018 | Connell | .............. A01M 7/0082 |
| 2020/0015406 A1* | 1/2020 | Wright | ................... A01C 7/203 |

FOREIGN PATENT DOCUMENTS

| | | | |
|---|---|---|---|
| JP | H1118517 A | * | 1/1999 |
| JP | 2002223612 A | * | 8/2002 |
| JP | 2003116304 A | | 4/2003 |
| JP | 2015147553 A | * | 8/2015 |
| KR | 20-0410295 Y1 | | 3/2006 |
| KR | 100749934 B1 | | 8/2007 |
| KR | 101854667 B1 | | 5/2018 |

\* cited by examiner

*Primary Examiner* — Marthe Y Marc-Coleman
(74) *Attorney, Agent, or Firm* — Rabin & Berdo, P.C.

(57) ABSTRACT

The present disclosure relates to a radio-controlled seed planter. The radio-controlled seed planter comprises a radio-controlled (RC) truck including a remote control module to cause the RC truck to be controlled remotely by a radio control unit; and a seeding unit coupled and installed in the RC truck to perform seeding work. The RC truck comprises a main frame; a subframe formed to be spaced apart from the main frame; an engine installed on the main frame; a battery installed on the subframe; driving units disposed on front and rear sides on both sides of the subframe, respectively, to drive wheels; and damper units installed between the main frame and the subframe to dampen impact. The radio-controlled seed planter makes it possible to carry out sowing work remotely, thereby improving the convenience and efficiency of sowing work and at the same time reducing labor.

13 Claims, 11 Drawing Sheets

RADIO-CONTROLLED SEED PLANTER

BACKGROUND OF THE INVENTION

Field of the Invention

The present disclosure relates to a radio-controlled seed planter. More particularly, it relates to a radio-controlled seed planter enabling seeding work to be carried out remotely by being configured such that a seeding unit is installed on a radio-controlled (RC) truck that can be remotely controlled by radio control and as a result, improving the convenience and efficiency of seeding work while reducing the labor required and also enabling accurate seeding to be carried out in conjunction with the traveling speed of the RC truck.

Description of the Related Art

The term "seeding" generally refers to sowing seeds to cultivate crops or vegetables.

Conventional seeding work was done in such a way that a person directly sowed seeds in soil on farmland. However, as agricultural technology developed, seed planters that automatically perform seeding work have been developed and popularized. In recent years, therefore, seeding work has been performed by using such seed planters in almost all areas except for special areas where it is difficult to operate a seed planter.

Typical seed planters include an attached-type seed planter that is attached to an agricultural machine such as a cultivator, a tractor and a farming machine operated by a worker, and a self-propelled planter that is directly operated by a worker.

The attached-type seed planter is widely used for seeding work on farmland with wide and flat topography so that agricultural machines can be operated easily, whereas the self-propelled seed planter is used on farmland with an area that is too small to operate the agricultural machines or on farmland with irregular topography.

As young and middle-aged people avoid farming in recent years, the manpower for farming in rural areas has naturally aged, with the result that agricultural machines are often operated by elderly people.

Therefore, in the case where seeding work is carried out using the attached-type seed planter, there is a disadvantage in that when elderly people operate the agricultural machines, they frequently have accidents due to their unskilled operation and careless manipulation of the agricultural machines.

In particular, cultivators or farming machines require a considerable amount of power in addition to driving technique when they are operated. In this case, there is a disadvantage in that it is not easy for elderly people to operate cultivators or farming machines smoothly due to their lack of muscle strength.

On the other hand, in the case where seeding work is carried out using the self-propelled seed planter, there is a problem in that elderly people suffer from exhaustion of physical strength when operating the self-propelled seed planter to perform seeding work for a long time in the daytime when the sunlight is strong.

In addition, there is also a disadvantage in that the labor cost burden increases when a worker(s) is hired to solve the difficulty of seeding work due to the exhaustion of physical strength.

CITATION LIST

Patent Literature

Patent Literature 1: Korean Registered Utility Model Publication No. 20-0410295

SUMMARY OF THE INVENTION

A radio-controlled seed planter of the present disclosure is proposed to solve the problems of the prior art as described above. It is an object of the present disclosure to provide a radio-controlled seed planter enabling seeding work to be carried out remotely by being configured such that a seeding unit is installed on a remote-controlled (RC) truck that can be remotely controlled by radio control.

It is another object of the present disclosure to enable accurate seeding to be carried out in conjunction with the traveling speed of the RC truck.

In accordance with one aspect of the present disclosure for accomplishing the objects as mentioned above, there may be provided a radio-controlled seed planter comprising: a radio-controlled (RC) truck including a remote control module to cause the RC truck to be controlled remotely by a radio control unit;

and a seeding unit coupled and installed in the RC truck to perform seeding work, wherein the RC truck comprises:

a main frame;

a subframe formed to be spaced apart from the main frame;

an engine installed on the main frame;

a battery installed on the subframe, the battery being charged by the power of the engine;

driving units disposed on front and rear sides on both sides of the subframe, respectively, to drive wheels 152 with electric power of the battery so as to produce driving power; and damper units installed between the main frame and the subframe to dampen impact.

Further, the driving unit of the present disclosure may comprise:

a wheel motor for providing power by electric power received from the battery; and a wheel coupled to a driving shaft of the wheel motor to rotate.

Further, the damper unit of the present disclosure may comprise:

a damping rod protruding vertically upward from a top surface of the main frame and having an engagement ledge formed on a top end thereof;

a guide bushing provided to the subframe in such a manner that the damping rod penetrates through the guide bushing; and a spring mounted between the engagement ledge formed on the top end of the damping rod and an upper end of the guide bushing to support the load to be applied to the main frame and to dampen vibration of the main frame when the RC truck travels.

Further, the seeding unit of the present disclosure may comprise:

a front frame joined to the rear of the RC truck;

side frames formed on both sides of the front frame;

a plurality of seeding modules installed at predetermined intervals on connecting rods installed between the two side frames;

a driving means installed on the side frame to drive the seeding modules; and a compaction roller installed behind the side frames to compact ridges where seeds are sown by the seeding modules and provided on one side thereof with an encoder for detecting the number of revolutions thereof.

Further, the seeding module of the present disclosure may comprise:

a mounting part through which the connecting rods penetrate;

a hopper installed above the mounting part to store seeds for sowing;

a seeding roller rotatably installed inside the hopper and having seed discharge grooves formed radially on an outer peripheral surface thereof to discharge seeds;

a roller sprocket installed at an outer end of a rotating shaft of the seeding roller to receive power via the driving means to rotate the seeding roller;

plows installed under the mounting part in a manner of descending and ascending to form seeding grooves in an upper surface of the ridges; and a soil covering and compaction means mounted resiliently behind the plows to cover seeds dropped into the seeding grooves by the seeding roller with soil.

Further, the driving means of the present disclosure may comprise:

a driving motor installed on one side of the side frame to drive in conjunction with the number of revolutions of the compaction roller which is detected by the encoder;

a driving sprocket mounted on a driving shaft of the driving motor;

a power transmission shaft installed between the side frames to transmit power to the seeding modules;

a driven sprocket installed at an opposite side of the power transmission shaft; and a roller chain connected between the driving sprocket and the driven sprocket to transmit power to the driven sprocket.

Further, the driving unit of the present disclosure may further comprise:

caterpillars connected between wheels installed on front and rear sides on both sides of the subframe.

Moreover, the RC truck may further comprise a GPS unit for receiving signals from GPS satellites and providing the current position to the radio control unit.

Further, the seeding roller of the present disclosure may be made of electrically conductive synthetic resin such that static electricity generated by friction is discharged to the ground via the rotating shaft, the mounting part and the plows, which are made of metal.

Moreover, the seeding roller further comprises a means for detecting discharge of static electricity provided on one side thereof wherein the means for detecting discharge of static electricity detects whether or not static electricity generated on the seeding roller is discharged and provides the detected signal to the remote control module such that the detected signal is transmitted to the radio control unit.

Moreover, the radio-controlled seed planter of the present disclosure may further comprise a vibration means for generating vibration, which is provided on one side of the hopper.

Further, the vibration means comprises a vibration motor provided on one side of the rotating shaft of the seeding roller to cause the seeding roller to vibrate.

Further, the vibration means comprises a pivoting shaft installed inside the hopper with its both ends rotatably mounted on both side walls of the hopper;

an actuating bar to be raised and lowered by rotation of the seeding roller by being configured such that one end of the actuating bar is fixedly mounted on an outer end of the pivoting shaft and the other end of the actuating bar is provided with a sliding roller to be inserted into a tooth groove of the roller sprocket mounted on the outer end of the pivoting shaft of the seeding roller; and a vibration plate installed inside the hopper with its one end fixedly mounted on the pivoting shaft to shake seeds stored in the hopper up and down by means of reciprocation and rotation at a predetermined angle of the pivoting shaft, which is caused by the actuating bar.

DETAILED DESCRIPTION OF THE PREFERRED EMBODIMENTS

Hereinafter, it should be understood that the following description explaining in detail a radio-controlled seed planter according to embodiments of the present disclosure is not intended to limit the technology described herein to a specific embodiment, but covers various modifications, equivalents, and/or alternatives of the embodiments of the present disclosure.

In the description with respect to the drawings, similar reference numerals may be used to refer to similar components. In addition, the terms "first," "second," etc. as used herein may modify various components regardless of their order and/or degree of importance and may be used merely to distinguish one component from another but not limit the components.

For example, "first part" and "second part" may represent different parts regardless of their order or degree of importance. For example, a first component may be designated as a second component and similarly a second component may be designated as a first component without departing from the scope of the present disclosure.

Further, the terms as used herein are intended to describe a specific embodiment but not limit the scope of other embodiments of the present disclosure. Singular expressions may include plural expressions unless the context clearly indicates otherwise.

All terms used herein including technical and scientific terms have the same meaning generally understood by a person having ordinary skill in the art pertaining to the present disclosure. As used herein, terms that are the same as ones defined in a commonly used dictionary may be interpreted as having a meaning consistent with or similar to the meaning in the context of the related art but not be interpreted as having an ideally or excessively formal meaning unless they are explicitly defined otherwise herein. In some cases, even the terms defined in the present disclosure should not be interpreted to exclude embodiments of the present disclosure.

Figure 1:
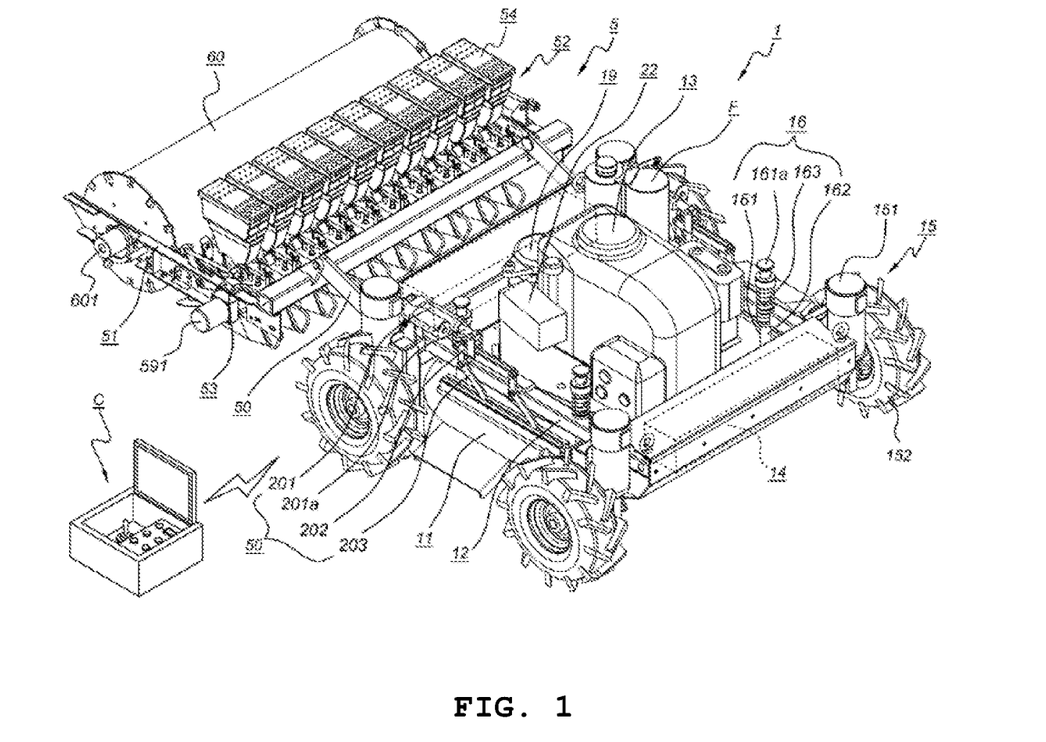
FIG. 1 is a perspective view of a radio-controlled seed planter according to an embodiment of the present disclosure.
Figure 2:
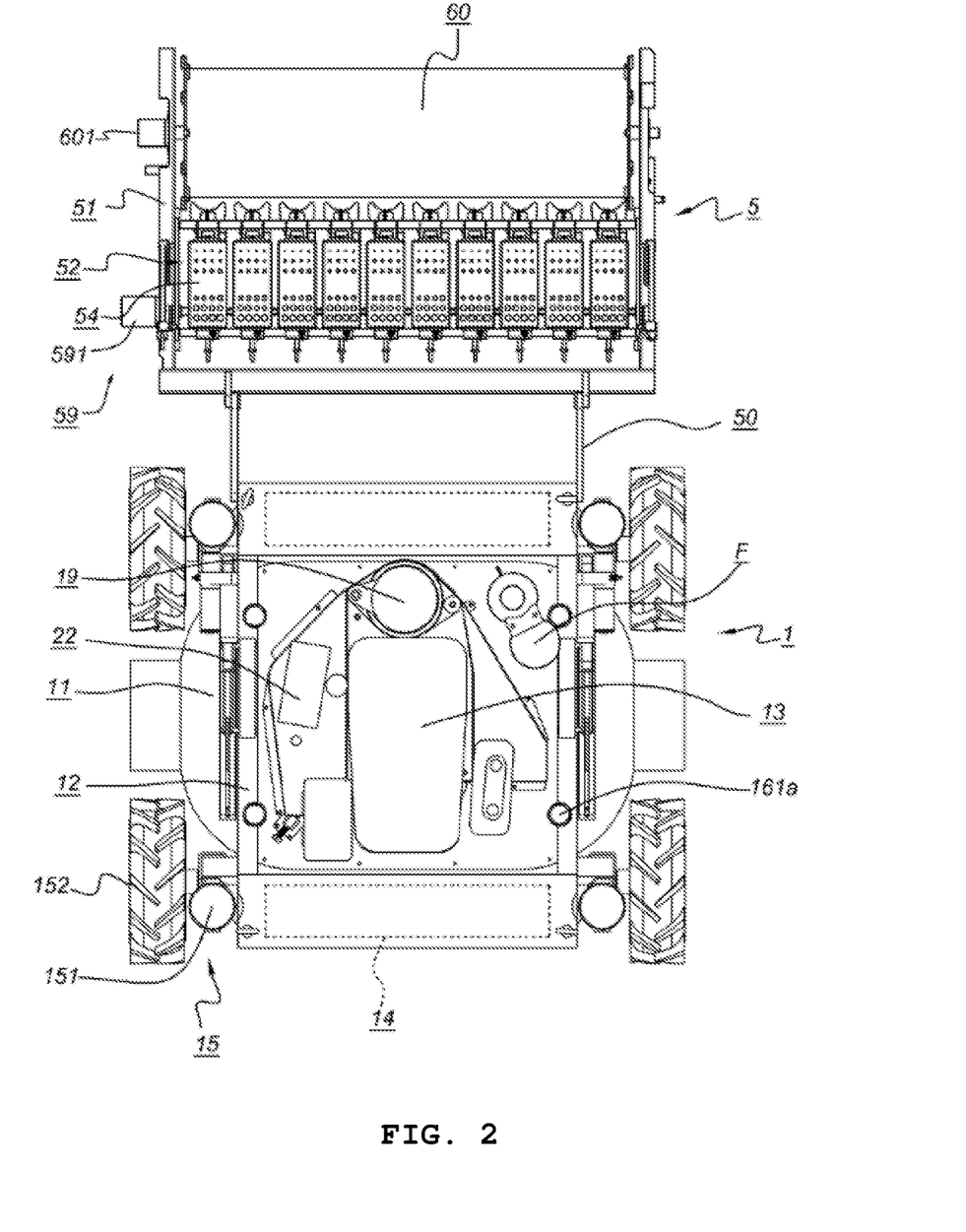
FIG. 2 is a top plane view of a radio-controlled seed planter according to an embodiment of the present disclosure.
Figure 3:
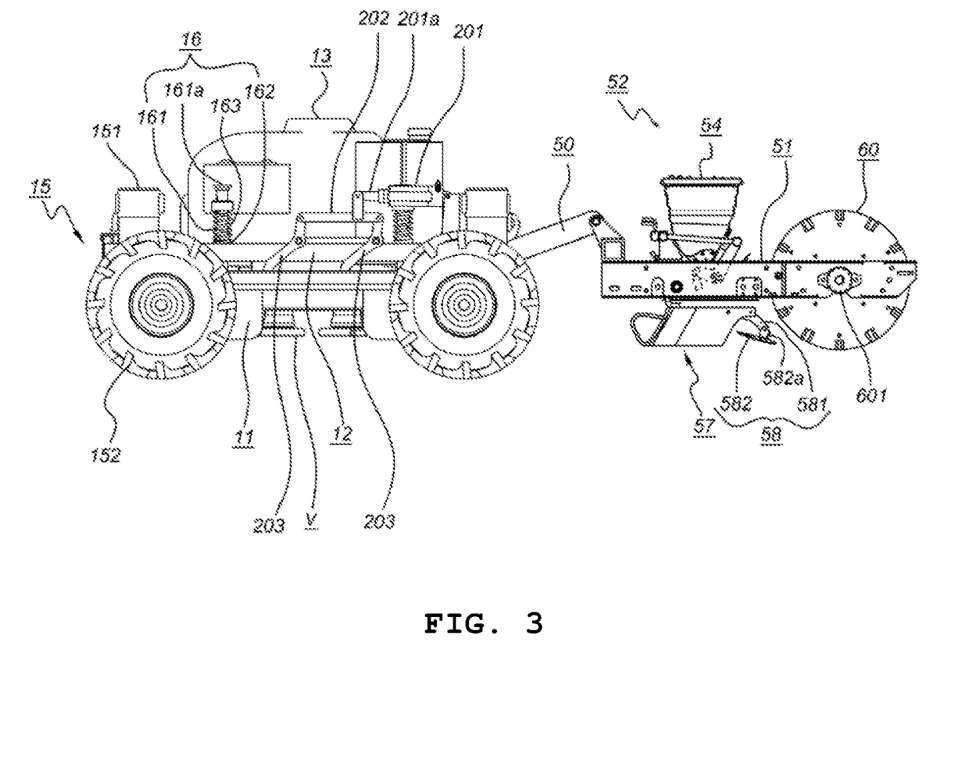
FIG. 3 is a side view of a radio-controlled seed planter according to an embodiment of the present disclosure.

FIGS. 1 to 3 are perspective, top plane and side views, respectively, of a radio-controlled seed planter according to an embodiment of the present disclosure.

This embodiment of the present disclosure will now be described with reference to FIGS. 1 to 3.

A radio-controlled seed planter according to this embodiment of the present disclosure comprises an RC truck 1 and a seeding unit 5.

The RC truck 1 includes a remote control module 10 to cause the RC truck to be controlled remotely by a radio control unit C, a main frame 11, a subframe 12, an engine 13, a generator 19, a battery 14, driving units 15, damper units 16, electric cylinders 201 and a blade V.

The radio control unit C transmits control signals to the RC truck 1 wirelessly by means of any one of a stationary control center, a mobile control center, a radio controller and a smartphone.

The stationary control center may schedule and monitor work contents of the RC truck 1 on the farm at home or in an office and store and analyze operation information on equipment on the farm to control the RC truck 1 remotely.

The operation information includes seeding amount, ratio of missing plants, seeding time and information on the RC truck.

The mobile control center may schedule and monitor work contents of the RC truck 1 on the farm in a moving vehicle and store and analyze operation information on equipment on the farm to control the RC truck 1 remotely.

The radio controller can be operated independently without a control center, control a plurality of RC trucks 1 remotely and analyze operation information on equipment on the farm.

The smartphone makes it possible to set the operation information on the farm and the work contents, control the RC truck remotely and monitor the RC truck in real time, so that manipulation and the position of the RC truck 1 can be controlled conveniently with the radio control unit C.

The main frame 11 is formed in a form of a plate at the center of the RC truck 1.

The subframe 12 is formed in a rectangular configuration above the main frame 11 in such a manner that it is spaced apart from the main frame 11.

The engine 13 is installed on the main frame 11.

The engine 13 may be a small-sized gasoline or diesel engine.

A fuel tank F for supplying fuel to the engine 13 is installed on the main frame 11.

The generator 19 linked to the engine 13 to receive rotational force from the engine so as to generate electric power is installed on the main frame 11.

The battery 14 is installed on the subframe 12 and charged by the generator 19.

The driving units 15 are disposed on front and rear sides on both sides of the subframe 12, respectively, and comprise wheel motors 151 and wheels 152 to generate traveling power using the electric power of the battery 14.

The wheel motors 151 are driven by electric power supplied from the battery 14.

Preferably, the wheel motors 151 may be motors capable of being controlled to rotate forward or reversely with controllable rotation speed.

The wheels 152 are coupled to driving shafts formed on the wheel motors 151, respectively, to be rotated by power provided by the wheel motors 151.

Therefore, rotation of the wheels 152 of the respective driving units 15 disposed on front and rear sides on both sides of the subframe 12 can be controlled independently so that various types of travel such as forward travel, backward travel and turning of the RC truck 1 can be made.

Each of the damper units 16 is installed between the main frame 11 and the subframe 12 and includes a damping rod 161, a guide bushing 162 and a spring 163 such that impact can be damped.

The damping rod 161 protrudes vertically upward from a top surface of the main frame 11.

The guide bushing 162 is formed perpendicularly to the subframe 12 in such a manner that the damping rod 161 penetrates through the guide bushing.

The spring 163 is mounted between an engagement ledge 161a formed on a top end of the damping rod 161 and an upper end of the guide bushing 162.

As a result, the load of the main frame 11 formed to be spaced apart from the subframe 12 is supported by the elastic force of the spring 163 so that the bottom surface of the main frame 11 is prevented from touching the ground surface.

In addition, vibration of the main frame 11, which is generated when the RC truck 1 travels, is damped by the spring 163.

In other words, when vibration of the subframe 12 is transmitted to the main frame 11 as the RC truck 1 travels on an uneven ground surface, the main frame 11 vibrates up and down.

At this time, vertical vibration of the main frame 11 is absorbed by the elastic force of the spring 163 mounted between the damping rod 161 provided to the main frame 11 and the guide bushing 162 provided to the subframe 12.

The electric cylinders 201 are interposed between the subframe 12 and the main frame 11 to elevate the main frame 11. To this end, as an example, each of the electric cylinders 201 is fixed to the subframe 12 such that the rod 201a faces forward, as shown in FIG. 1.

In addition, a link assembly is configured such that it is pivotably mounted to the subframe 12 wherein an upper end 202 of the link assembly is hinged to the rod 201a while a lower end 203 of the link assembly is hinged to the main frame 11.

Accordingly, when the rod 201a moves forward, the main frame 11 is moved rearward and at the same time lowered by pivoting of the link assembly. On the other hand, when the rod 201a moves rearward, the main frame 11 is moved forward and at the same time raised by reversal pivoting of the link assembly. In this case, it is natural that raising or lowering and simultaneous moving forward or rearward of the main frame 11 is caused by pivoting of the link assembly and hence may be adjusted so as not to interfere with other components. Further, a power source of the electric cylinder 201 is configured to receive electric power from the battery 14.

In addition, the blade V is configured such that it is linked to the engine 13 to receive rotational force from the engine and is exposed under the main frame 11 to be capable of weeding. In other words, a shaft (not shown) mounted to the engine 13 to rotate is rotatably supported on the main frame 11 and the blade V is fixed to the shaft projecting downward from the main frame 11.

Figure 4:
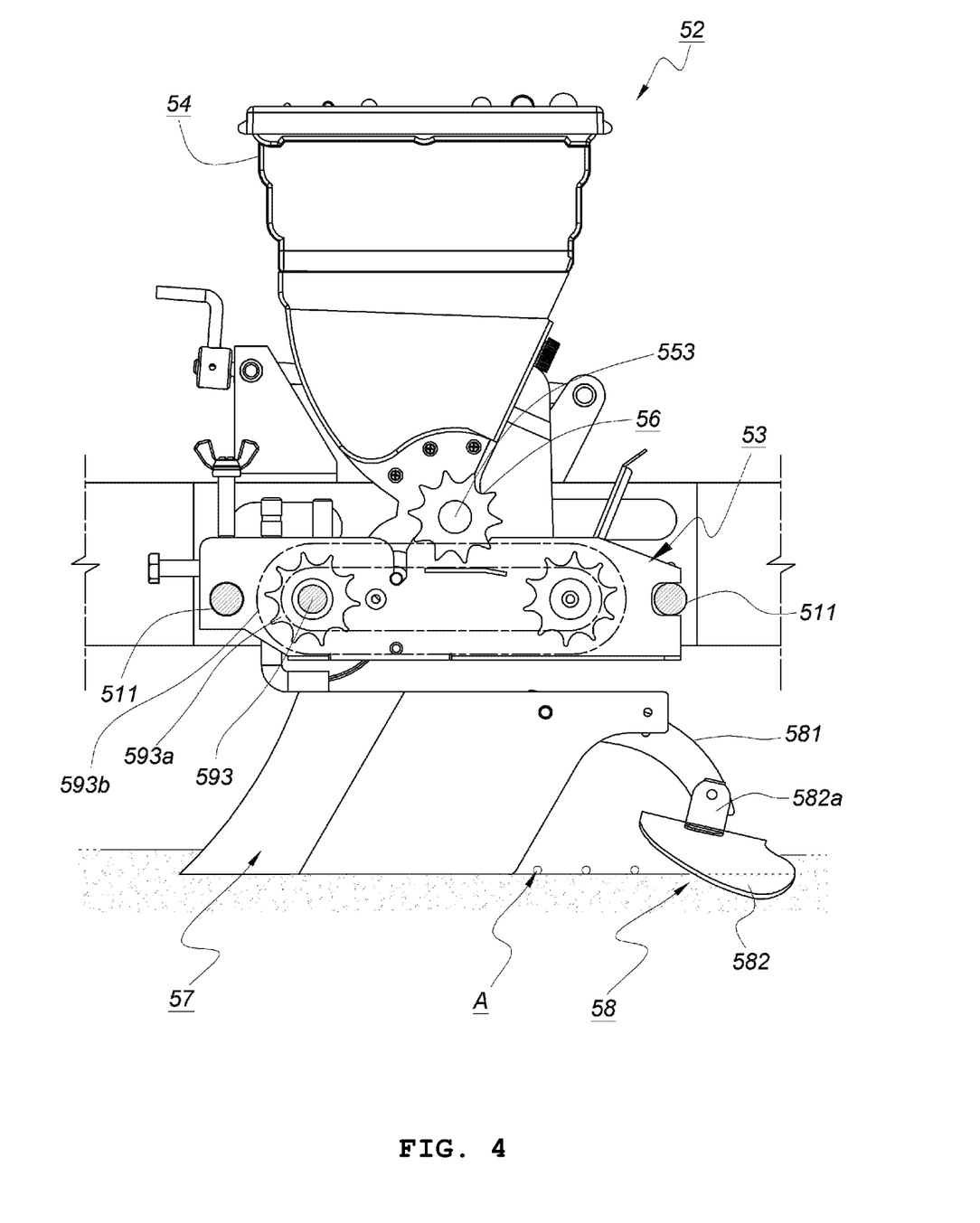
FIG. 4 is a side cross-sectional view of a seeding unit of a radio-controlled seed planter according to an embodiment of the present disclosure.
Figure 5:
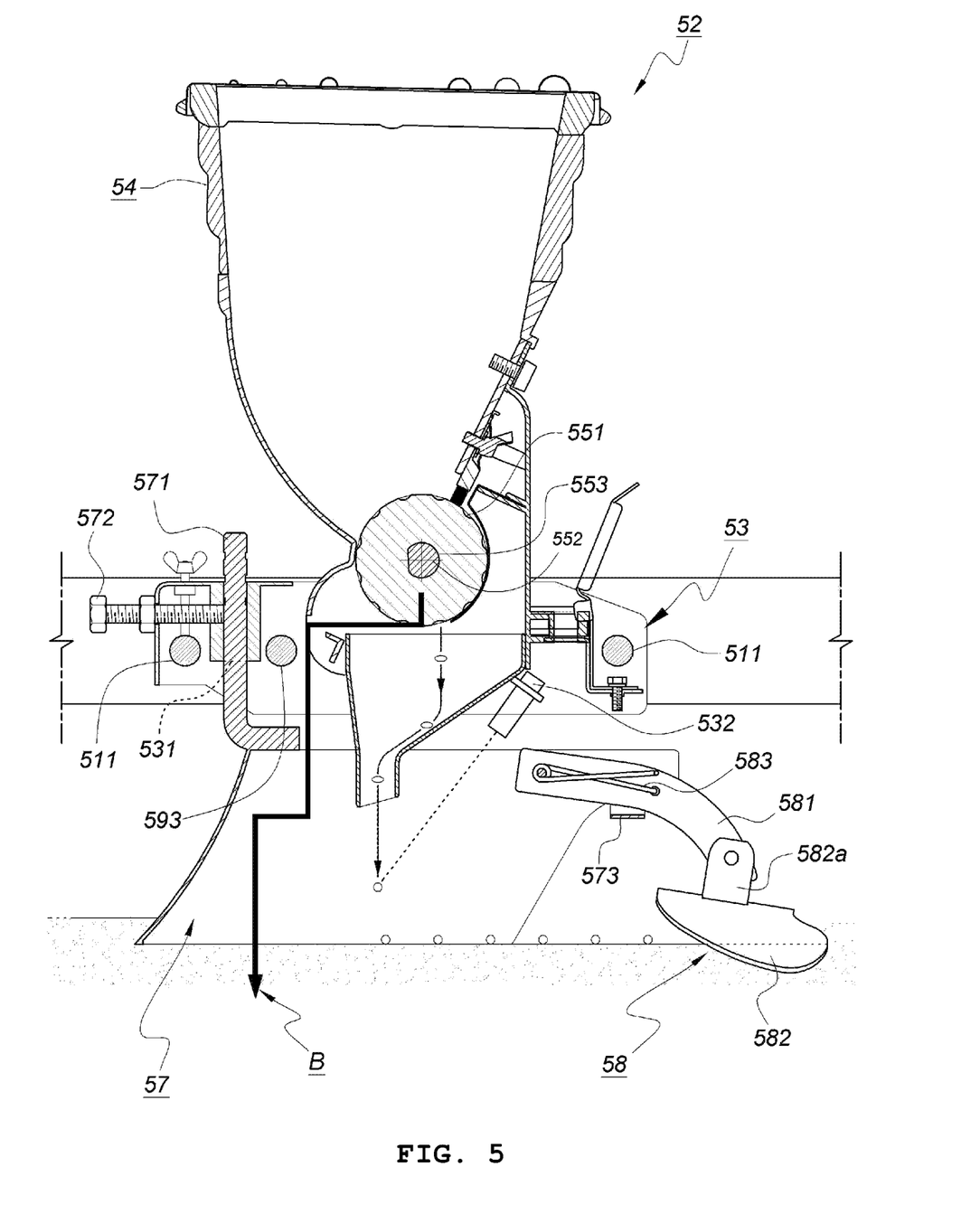
FIG. 5 is a side cross-sectional view of a seeding module of a radio-controlled seed planter according to an embodiment of the present disclosure.

FIG. 4 is a side cross-sectional view of a seeding unit of a radio-controlled seed planter according to an embodiment of the present disclosure, and FIG. 5 is a side cross-sectional view of a seeding module of a radio-controlled seed planter according to an embodiment of the present disclosure.

Embodiments of the present disclosure will now be described with reference to FIGS. 1 to 5.

The seeding unit 5 includes a front frame 50, side frames 51, seeding modules 52, a driving means 59 and a compaction roller 60 for performing seeding work.

The front frame 50 is installed to be joined to the rear of the RC truck 1.

The side frames 51 are formed to protrude rearward from both sides of the front frame 50.

A plurality of seeding modules 52 are disposed at predetermined intervals on connecting rods 511 mounted between the two side frames 51 wherein each of the seeding modules includes a mounting part 53, a hopper 54, a seeding roller 55, a roller sprocket 56, a plow 57 and a soil covering and compaction means 58.

The mounting part 53 is supported by at least a plurality of connecting rods 511 mounted between the two side frames 51 in such a manner that the connecting rods 511 penetrate through the mounting part.

The hopper 54 is installed above the mounting part 53 to store seeds for sowing.

The hopper 54 is made of a transparent synthetic resin material with excellent weather resistance such that the remaining amount of seeds for sowing stored therein can be identified and oxidation of the seeds by natural light or ultraviolet rays can be prevented. The hopper is detachably attached to a top portion of the mounting part 53.

The seeding roller 55 is rotatably installed inside the hopper 54 and provided with seed discharge grooves 551 formed radially on an outer peripheral surface of the seeding roller to discharge seeds to be introduced into the seed discharge grooves 551 to the outside of the hopper 54 as the seeding roller rotates.

The seed discharge groove 551 may vary in size and shape depending on the kinds of seeds to be sown and formed in any one of various shapes such as a hemisphere, ellipse or particle shape corresponding to the size and shape of the seeds to be sown at one time.

For example, in the case where the seed is spherical, the seed discharge groove 551 is formed in a hemispherical shape corresponding to the size and shape of the seed such that a single spherical seed can be dropped therein.

On the other hand, the seeding roller 55 may be preferably formed of electrically conductive synthetic resin to discharge static electricity generated by friction via the rotating shaft 553.

In other words, as the seeding roller 55 made of the electrically conductive synthetic resin and installed inside the hopper 54 rotates, friction occurring between the outer peripheral surface of the seeding roller 55 and seeds stored in the hopper 54 causes frictional charge, and in turn, static electricity is generated on the seeding roller 55.

At this time, since the seeding roller 55 is made of the electrically conductive synthetic resin and thus has very low electrical resistance and excellent conductivity, static electricity generated on the seeding roller 55 flows to the mounting part 53 via the metallic rotating shaft 553 coupled to the center of the seeding roller 55 and is then discharged to the ground surface via the metallic plow 57 installed under the mounting part 53.

The seeds inside the hopper 54 are prevented from attaching to the outer peripheral surface of the seeding roller 55 or the seed discharging grooves 551 formed on the outer peripheral surface of the seeding roller 55 by static electricity so that free fall of the seeds dropped into the seed discharge grooves 551 during rotation of the seeding roller 55 is smooth, thereby preventing defective seeding due to static electricity.

The roller sprocket 56 is installed at an outer end of the rotating shaft 553 of the seeding roller 55 to receive power from the driving means 59 and transmit the power to the rotating shaft 553 so that the seeds are discharged as the seeding roller 55 rotates.

The plow 57 is installed to be raised or lowered under the mounting part 53 so as to form a seeding groove at a predetermined depth on the top surface of the ridge so that seeds discharged by the seeding roller 55 drop into the seeding groove and are finally sown.

The plow 57 is made of metal so as to discharge static electricity discharged from the seeding roller 55 to the ground while forming the seeding groove in the upper surface of the ridge along the travel direction of the seed planter, and installed under the mounting part 53 in such a manner that it is raised or lowered.

In other words, the plow 57 is configured such that a coupling rod 571 is formed to protrude upward on a top end of the plow and the coupling rod 571 is inserted from a lower portion of a fitting hole 531 formed on one side of the mounting part 53 upward into the fitting hole and then fixed by screw-fastening a fixing bolt 572 in a direction perpendicular to the fitting hole 531 in front of the mounting part 53 such that the outer circumference of the coupling rod 571 is pressed and fixed by the fixing bolt, so that the height of the plow 57 can be adjusted by unlocking and then tightening the fixing bolt 572.

Therefore, when forming the seeding groove is required, the height of the plow 57 is appropriately adjusted and fixed such that the plow 57 is inserted to a desired depth from the surface of the ridge, so the plow 57 plows the seeding groove in the surface of the ridge along the travel direction of the seed planter as the seed planter travels. At the same time, static electricity that is discharged from the seeding roller 55 and then flows through the power transmission shaft 593 and the mounting part 53, which are made of metal, is finally discharged to the ground through the plow 57 in contact with the ground surface so that static electricity generated by the seeding roller 55 is smoothly discharged.

On the other hand, when forming the seeding groove is not necessary, the height of the plow 57 is raised and fixed to the maximum to prevent contact between the plow 57 and the ground, thereby facilitating movement of the seed planter.

The soil covering and compaction means 58 is mounted resiliently behind the plow 57 to cover seeds dropped into the seeding groove by the seeding roller 55 with soil to complete sowing.

The soil covering and compaction means 58 includes a connecting plate 581, a soil covering plate 582 and a torsion spring 583.

The connecting plate 581 is pivotably hinged to one end of the plow 57 by a hinge pin.

The soil covering plate 582 is formed to be bent downward in such a manner that both ends thereof contact with the ground surface. A coupling plate 582a is formed to protrude from a top portion of the soil covering plate and is coupled to the other end of the coupling plate 581 by a nut and a bolt in such a manner that the angle of the soil covering plate is adjusted.

The torsion spring 583 is mounted in such a manner that the center of the spring is fitted to the hinge pin while one end thereof is fixed to the plow 57 and the other end thereof is fixed to the connecting plate 581 such that the soil covering plate 582 elastically and closely contacts the ground.

Therefore, when the seeding groove is formed in the upper surface of the ridge by the plow 57 as the seed planter travels, the elastic force of the torsion spring 583 acts whereby the soil covering plate 582 mounted to the other end of the pivotally movable connecting plate 581 is elastically brought into close contact with the upper surface of the ridge and therefore the soil on both sides of the seeding grove is raked together toward the center of the ridge as the seed planter travels so that the seeds dropped into the seeding groove are covered with soil and thus sowing is completed.

In order to prevent excessive pivoting of the connecting plate 581 when the connecting plate 581 is elastically pivoted by the elastic force of the torsion spring 583, a stopper 573 for supporting the connecting plate 581 is preferably provided on one side of the plow 57 where the connecting plate 581 is hinged.

The driving means 59 is installed on the side frame 51 to drive the seeding module 52 and includes a driving motor 591, a driving sprocket 592, a power transmission shaft 593, a driven sprocket 594 and a roller chain 595.

The driving motor 591 is installed on one side of the side frame 51 and is driven in conjunction with the number of revolutions of the compaction roller 60, which is provided by an encoder 601 installed in the compaction roller 60.

The driving sprocket 592 is mounted on a driving shaft of the driving motor 591.

The power transmission shaft 593 is installed between the side frames 51 to transmit power to the seeding modules 52.

In other words, the power transmission shaft 593 is installed in such a manner that it commonly penetrates through the mounting parts 53 formed in a plurality of seeding modules 52 installed between the side frames 51.

In this case, a plurality of chain sprockets 593a are installed at predetermined intervals on the power transmission shaft 593, while a roller chain 593b for transmitting power to the roller sprocket 56 installed on the rotating shaft 553 of the seeding roller 55 of each seeding module 52 is installed on each chain sprocket 593a so that all the seeding rollers 55 of the seeding modules 52 are simultaneously rotated at the same rotational speed by the rotation of the power transmission shaft 593.

The driven sprocket 594 is installed at an opposite side of the power transmission shaft 593.

The roller chain 595 is mounted to connect the driving sprocket 592 and the driven sprocket 594. Therefore, when the power transmission shaft 593 is rotated by the driving motor 591 which is driven in conjunction with the number of revolutions of the compaction roller 60, all the seeding rollers 55 of the seeding modules 52 simultaneously rotate at the same rotational speed.

The compaction roller 60 is installed behind the side frames 51 in such a manner that it can be rotated by friction with the ground. The compaction roller serves to compact the ridges where seeds are covered with soil by means of pressure by load of the compaction roller 60 after seeds are sown by the seeding modules 52 as the seeding unit travels.

The compaction roller 60 is preferably formed with radial spikes on the outer circumferential surface thereof such that it is rotated exactly without slippage during rotation due to friction with the ground surface.

The encoder 601 is installed on one side of the compaction roller 60 to detect the number of revolutions of the compaction roller 60 and provide it to a control unit of the driving motor 591.

Figure 6:
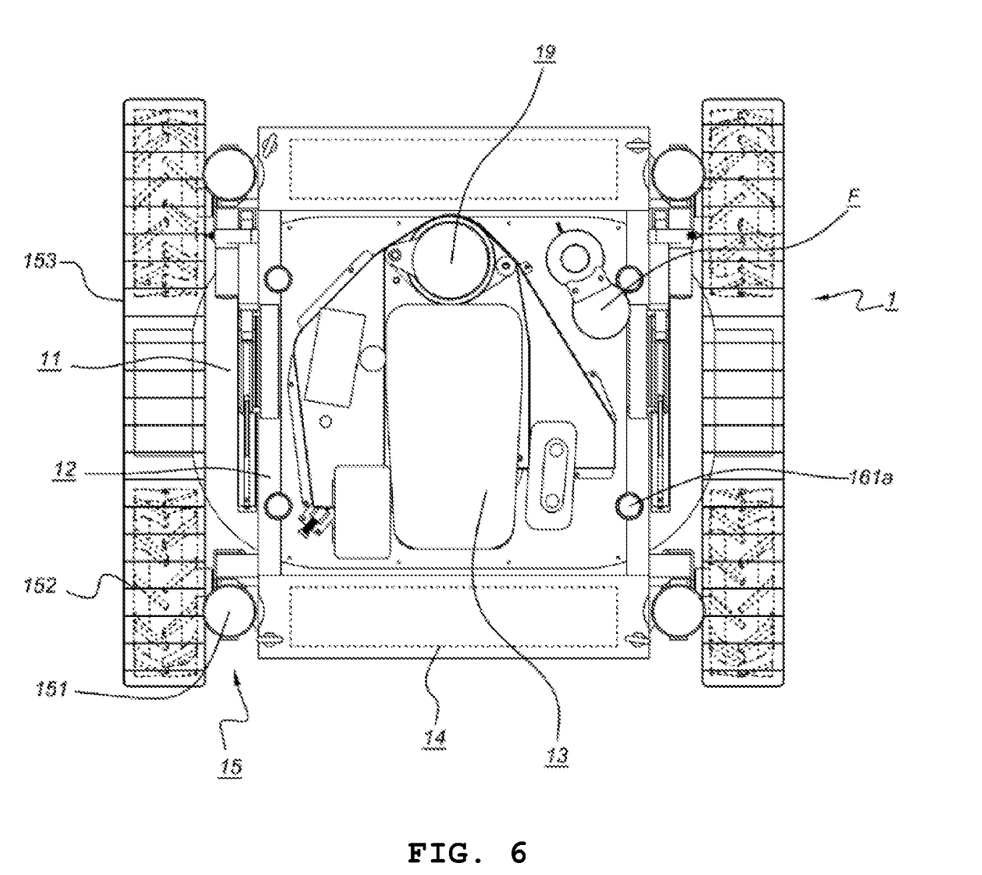
FIG. 6 is a top plane view of a driving unit of a radio-controlled seed planter according to another embodiment of the present disclosure.

FIG. 6 is a top plane view of a driving unit of a radio-controlled seed planter according to another embodiment of the present disclosure.

This embodiment of the present disclosure will now be described with reference to FIG. 6.

The driving units 15 may further comprise caterpillars 153 connected between wheels 152 installed on front and rear sides on both sides of the subframe 12.

The caterpillars 153 connect between the wheels 152 installed on front and rear sides on both sides of the subframe 12 so that when the wheels 152 are driven, the driving force of the wheels 152 is transmitted to the ground and thus the RC truck 1 travels smoothly while it is possible to prevent the ground surface from being dug into deeply by the wheels 152 and thus prevent wheel marks from being formed on the ground.

In addition, the caterpillars make it possible to work even in a place where the turning radius is small and at the same time travel efficiently even in a sloping place.

Figure 7:
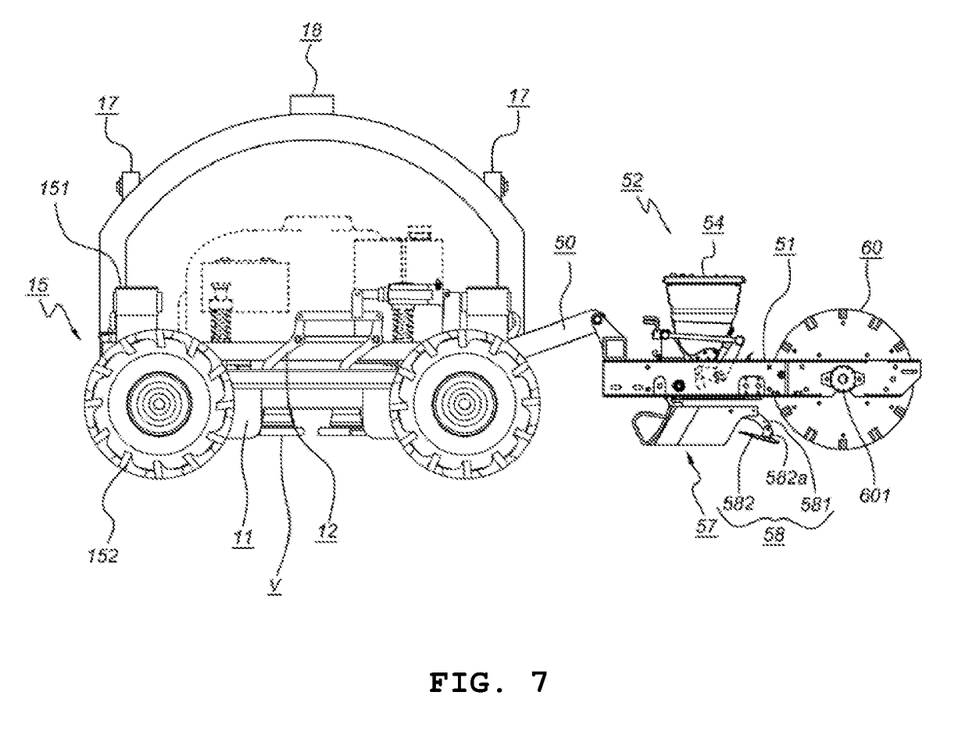
FIG. 7 is a side view showing a camera unit and a GPS unit of a radio-controlled seed planter according to another embodiment of the present disclosure.

FIG. 7 is a side view showing a camera unit and a GPS unit of a radio-controlled seed planter according to another embodiment of the present disclosure.

This embodiment of the present disclosure will now be described with reference to FIG. 7.

The RC truck 1 may further comprise a camera unit 17 for providing the radio control unit C with image data obtained by photographing the surroundings.

In other words, images photographed by the camera unit 17 are transmitted to a remote control module 10 and in turn to the radio control unit C so that an operator can identify the images photographed by the camera unit 17 in real time via the radio control unit C, with the result that it is easy for the operator to check the surroundings during seeding work or general traveling and thus it is possible to prevent an accident from occurring due to obstacles or people.

The RC truck 1 may further comprise a GPS unit 18 for receiving signals from GPS satellites and providing the current position to the radio control unit C.

Therefore, it is possible to grasp the position of the RC truck 1 in real time and digitize data of the current work status and progress of the seeding work, whereby more efficient seeding work can be performed.

Figure 8:
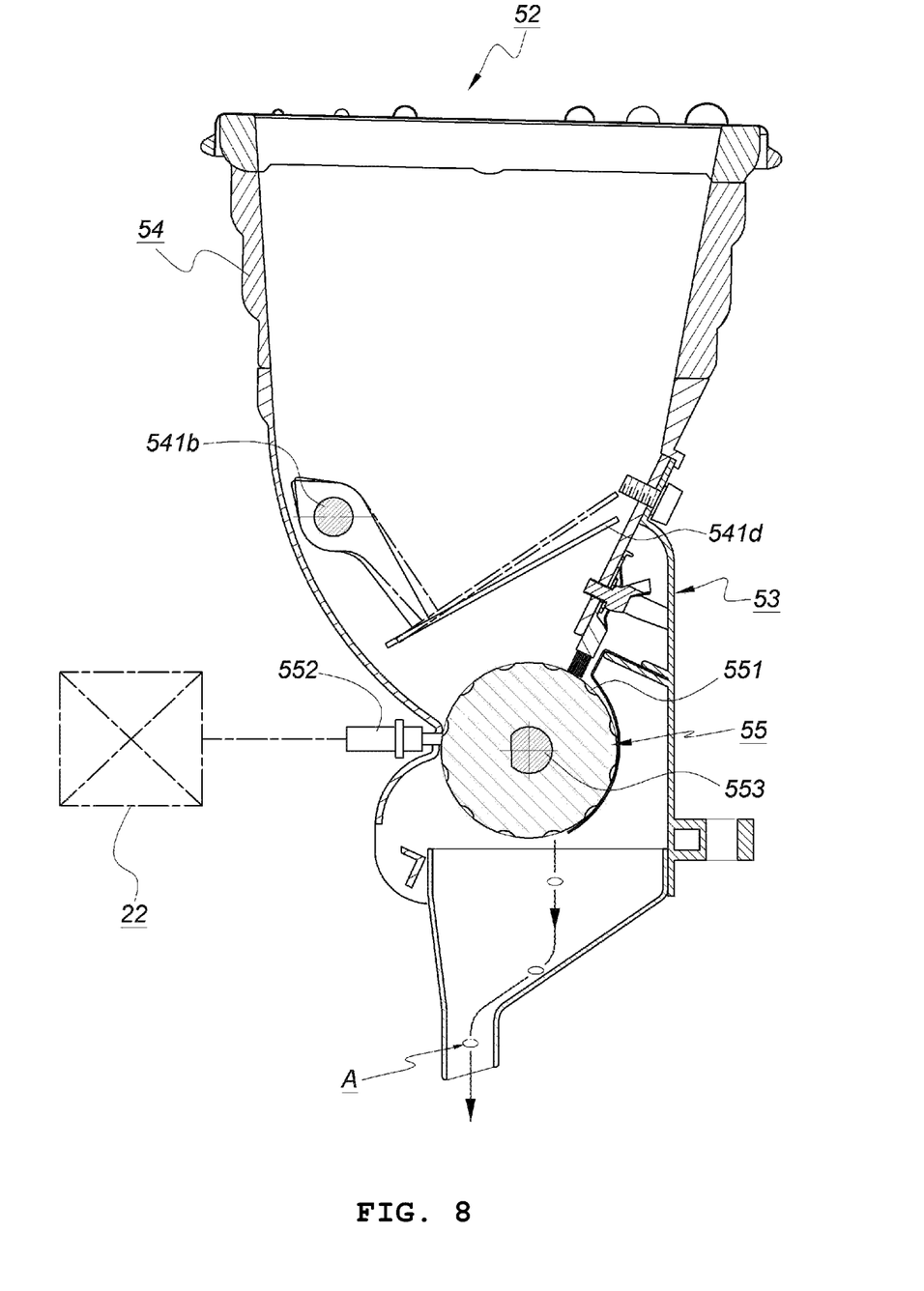
FIG. 8 is a side cross-sectional view showing a means for detecting discharge of static electricity of a radio-controlled seed planter according to another embodiment of the present disclosure.
Figure 9:
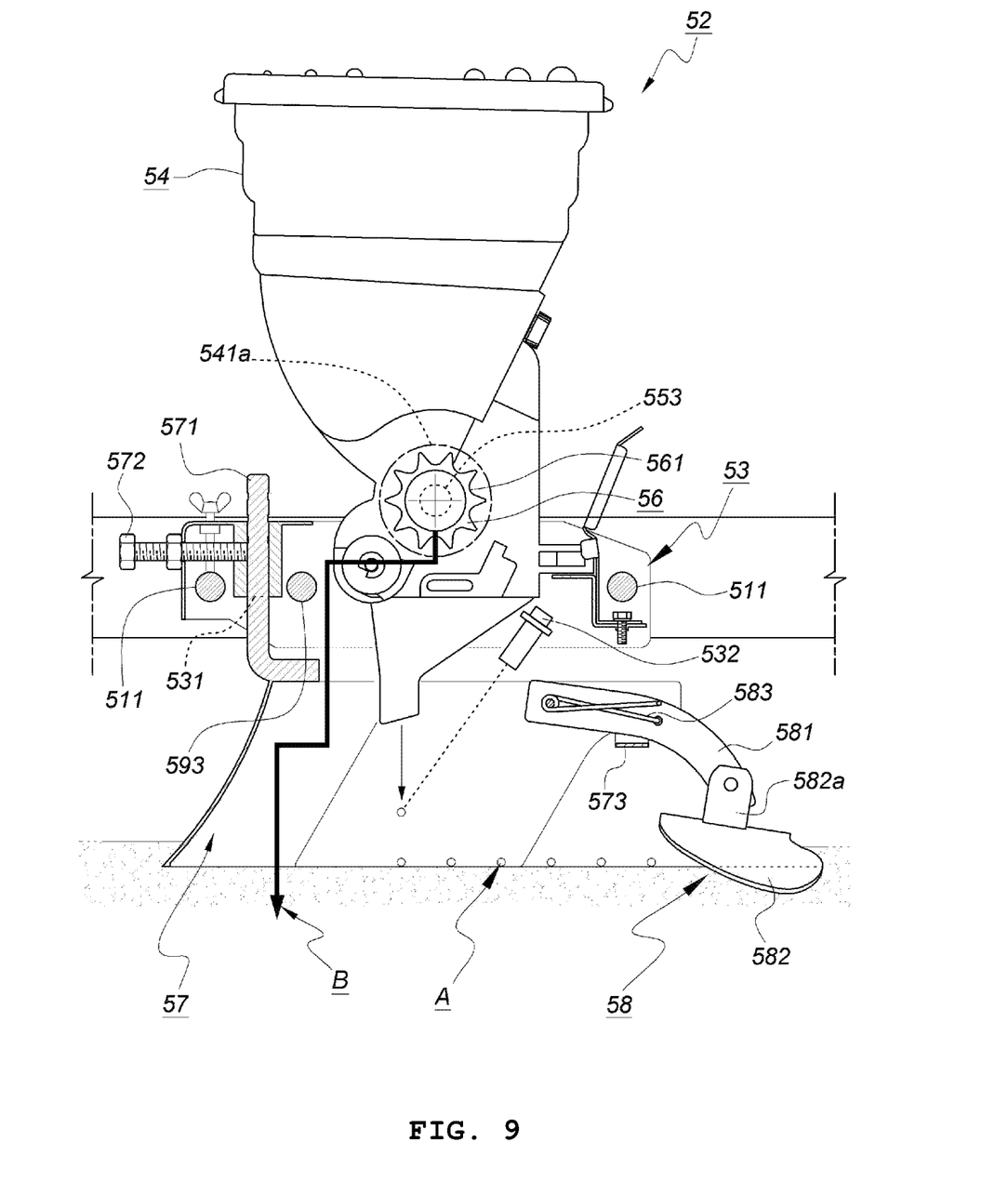
FIGS. 9 and 10 are side cross-sectional views showing a vibration means of a radio-controlled seed planter according to another embodiment of the present disclosure.
Figure 10:
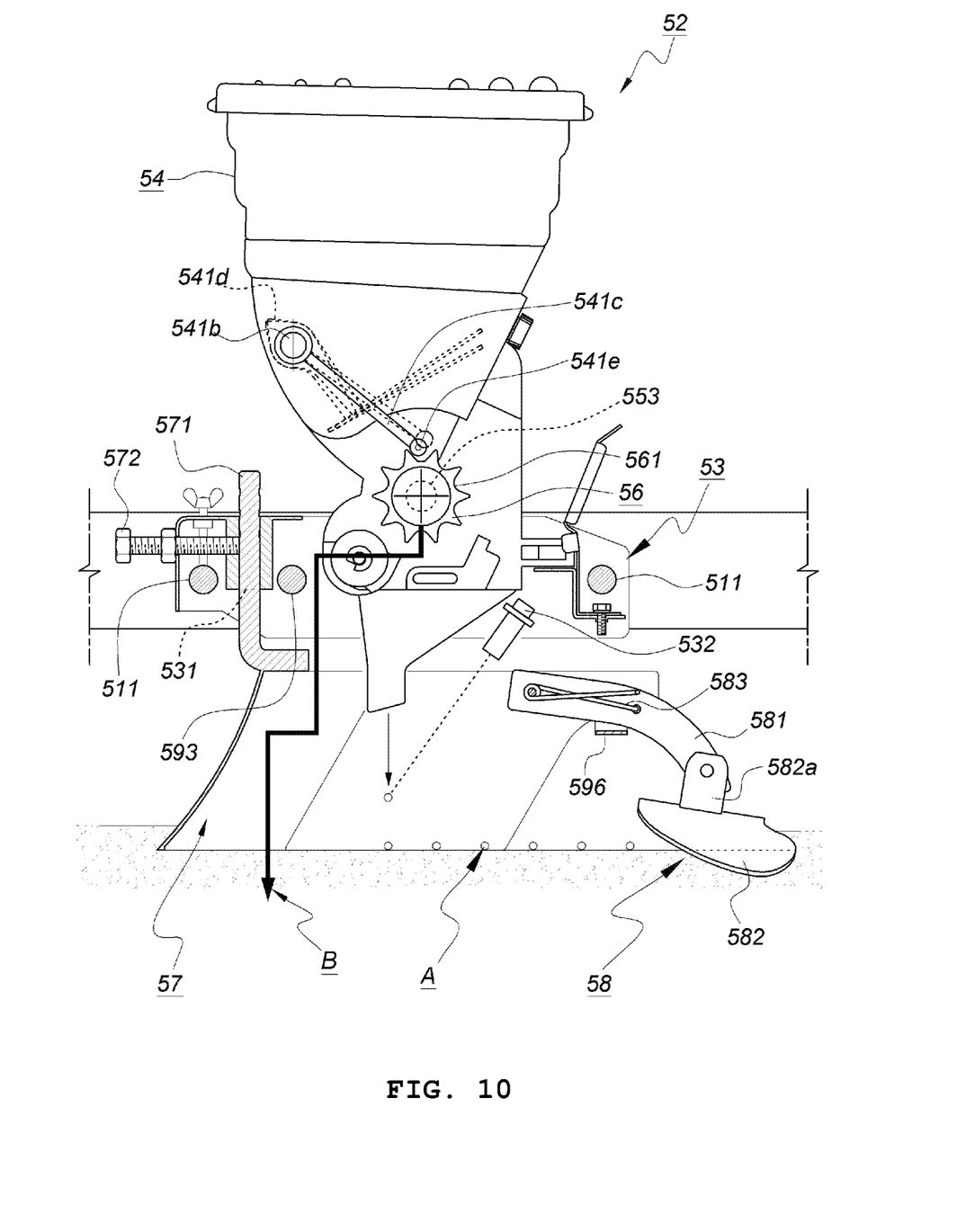

FIG. 8 is a side cross-sectional view showing a means for detecting discharge of static electricity of a radio-controlled seed planter according to another embodiment of the present disclosure and FIGS. 9 and 10 are side cross-sectional views showing a vibration means of a radio-controlled seed planter according to another embodiment of the present disclosure.

Embodiments of the present disclosure will now be described with reference to FIGS. 8 to 10.

The seeding roller 55 may further comprise a means 552 for detecting discharge of static electricity provided on one side thereof wherein the means for detecting discharge of static electricity detects whether or not static electricity generated on the seeding roller 55 is discharged and provides the detected signal to the remote control module 10 such that the detected signal is transmitted to the radio control unit C.

The mounting part 53 may further comprise a photosensor 532 provided on one side thereof wherein the photosensor detects seeds that are finally discharged by the seeding roller 55 and sown in the seeding groove in the ground and provides the detected signal to the remote control module 10 such that the detected signal is transmitted to the radio control unit C.

Therefore, the operator who controls the radio control unit C can not only remotely check whether the static electricity of each of the seeding modules 52 is normally discharged and whether defective seeding occurred through the radio control unit C but also store and manage various data relevant to seeding work such as seeding speed, ratio of missing plants, ratio of damage, seeding area and the like or transmit and share the data through network.

The hopper 54 may further comprise a vibration means 541 for generating vibration, which is provided on one side thereof.

As an example, the vibration means 541 may comprise a vibration motor 541a provided on one side of the rotating shaft 553 of the seeding roller 55 to cause the seeding roller 55 to vibrate, as shown in FIG. 9.

Therefore, as the seeding roller 55 vibrates by the vibration motor 541a, seeds can be accurately introduced into the seed discharge grooves when seeds for sowing stored in the hopper 54 are introduced into the seed discharge grooves 551 formed radially on the outer peripheral surface of the seeding roller 55.

In other words, each of the seed discharge grooves 551 formed on the outer peripheral surface of the seeding roller 55 is formed in a shape corresponding to the size and shape of the seed to be sown. Therefore, when the seeding roller 55 rotates at the lower portion of the hopper 54 in which seeds for sowing are stored, one of the seeds stored in the hopper 54, which is adjacent to the seeding roller 55, is inserted into the seed discharge groove 551.

However, when the seed has a long oval shape, there occurs a case in which the seed is not accurately injected into the seed discharge groove 551 of the seeding roller 55, but is transported by rotation of the seeding roller 55 in a state where it is partially placed in the seed discharge groove and eventually breaks away from the seed discharge groove 551 back toward the inside of the hopper 54 with the result that the seed is not sown.

Therefore, in the case where the seed is not accurately injected into the seed discharge groove 551 but partially placed in the groove as described above, when the seeding roller 55 is vibrated by the vibrating means 541, the seed partially placed in the seed discharge groove 551 is correctly put into the seed discharge groove 551 or completely breaks away from the seed discharge groove and another adjacent seed is put into the seed discharge groove 551 instead, with the result that the discharge of seeds in the hopper 54 by the seeding roller 55 becomes more accurate.

Alternatively, the vibration motor 541a may be installed on one side of the hopper 54 to vibrate the hopper 54 in order to ensure that the accuracy of inserting and discharging seeds by the seeding roller 55 provided under the hopper 54 is improved.

As another example, the vibration means 541 may include a pivoting shaft 541b, an actuating bar 541c and a vibration plate 541d, as shown in FIG. 10.

The pivoting shaft 541b is installed inside the hopper 54 with its both ends rotatably mounted on both side walls of the hopper 54.

The actuating bar 541c can be raised and lowered by rotation of the seeding roller 55 by configuring it such that one end of the actuating bar is fixedly mounted on an outer end of the pivoting shaft 541b and the other end of the actuating bar is provided with a sliding roller 541e to be inserted into a tooth groove 561 of the roller sprocket 56 mounted on the outer end of the rotating shaft 553 of the seeding roller 55.

The vibration plate 541d is installed inside the hopper 54 with its one end fixedly mounted on the pivoting shaft 541b to shake seeds stored in the hopper up and down 54 by means of reciprocation and rotation at a predetermined angle of the pivoting shaft 541b, which is caused by the actuating bar 541c.

Therefore, when the roller sprocket 56 is rotated by the driving means 59 as the mounting part 53 of the seed planter travels, the sliding roller 541e mounted on one end of the actuating bar 541c ascends and descends from the tooth groove 561 of the roller sprocket 56 by an amount of the outer diameter of the roller sprocket 56 whereby the pivoting shaft 541b to which the other end of the actuating bar 541c is coupled repeats forward and reverse rotation at a predetermined angle.

In this case, since the pivoting shaft 541b is installed inside the hopper 54 and one end of the vibration plate 541d installed inside the hopper 54 is fixed to one side of the outer peripheral surface of the pivoting shaft 541b, when the pivoting shaft 541b is rotated forward and reversely at the predetermined angle, seeds stored in the hopper 54 are shaken up and down as the vibration plate 541d reciprocates and rotates at a predetermined angle together with the pivoting shaft 541b so that seeds are prevented from being lumped together within the hopper 54 and thus smooth sowing of seeds is carried out through smooth insertion and discharge of seeds.

Therefore, the vibrating means 541 prevents clogging of seeds in the hopper 54 so that the seeds in the hopper 54 can be quantitatively supplied.

Figure 11:
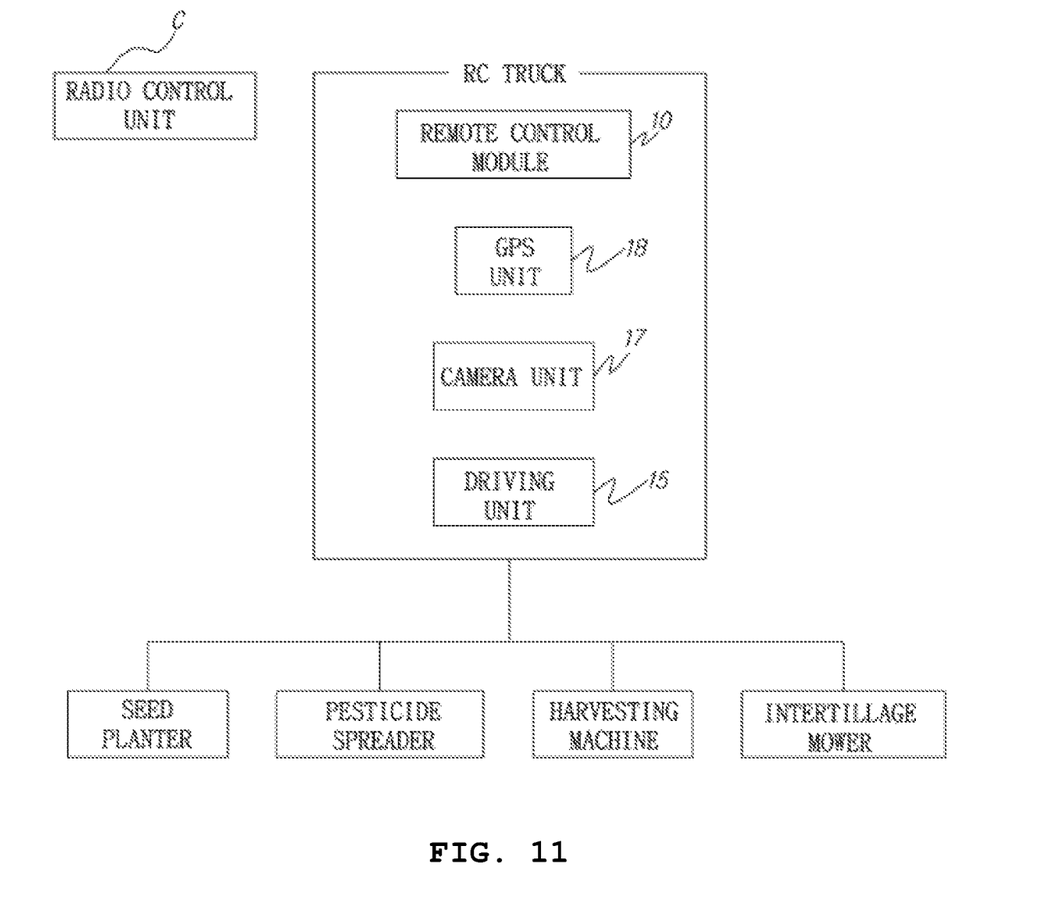
FIG. 11 is a conceptual diagram illustrating the use of a radio-controlled agricultural machine.

FIG. 11 is a conceptual diagram illustrating the use of a radio-controlled agricultural machine.

Description will be made with reference to FIG. 11.

The RC truck according to embodiments of the present disclosure is provided with the remote control module, the GPS unit and the camera unit so that unmanned operation of the RC truck can be carried out according to control by the radio control unit.

Meanwhile, in addition to the seed planter, various types of agricultural machines such as pesticide sprayers, harvesters and intertillage mowers can be detachably mounted to the RC truck. This makes it possible to use the desired agricultural machine according to the user's needs so that utilization of the RC truck is also increased.

The radio-controlled seed planter according to embodiments of the present disclosure is configured such that the seeding unit is installed on the RC truck that is controlled remotely by radio control so that it is possible to carry out seeding work remotely. Therefore, the inventive radio-controlled seed planter has advantageous effects in that seeding work can be carried out without the necessity for the operator to directly operate the agricultural machine or manually operate the seed planter for seeding work, with the result that convenience and efficiency of seeding work are improved.

Further, as the operator controls the RC truck wirelessly and remotely to perform the seeding work, embodiments of the present disclosure have advantageous effects in that the labor required for seeding work is greatly reduced and the fatigue and exhaustion of workers due to tough seeding work in the field are avoided.

Further, as the inventive seed planter is configured to perform seeding work in conjunction with the traveling speed of the RC truck, it also has an advantageous effect in that accurate seeding work such as maintenance of a constant seeding interval and the like can be performed.

While the present disclosure has been illustrated and described with reference to exemplary embodiments thereof, it will be apparent that the present disclosure is not limited to the embodiments described above and various modifications can be made by those skilled in the art within the scope of the technical idea of the present disclosure. In addition, while work and the effect of the corresponding configuration of the present disclosure are not explicitly described and explained, it is a matter of course that predictable effects should also be recognized.

What is claimed is:

1. A radio-controlled seed planter comprising:
   a radio-controlled (RC) truck including a remote control module to cause the RC truck to be controlled remotely by a radio control unit; and
   a seeding unit coupled and installed in the RC truck to perform seeding work;
   wherein the RC truck comprises:
   a main frame;
   a subframe formed to be spaced apart from the main frame;
   an engine installed on the main frame;
   a battery installed on the subframe, the battery being charged by power of the engine;
   driving units disposed on front and rear sides on both sides of the subframe, respectively, to drive wheels with electric power of the battery so as to produce driving power; and
   damper units installed between the main frame and the subframe to dampen impact;
   wherein the damper unit comprises:
   a damping rod protruding vertically upward from a top surface of the main frame and having an engagement ledge formed on a top end thereof;
   a guide bushing provided to the subframe in such a manner that the damping rod penetrates through the guide bushing; and
   a spring mounted between the engagement ledge formed on the top end of the damping rod and an upper end of the guide bushing to support a load to be applied to the main frame and to dampen vibration of the main frame when the RC truck travels.

2. The radio-controlled seed planter according to claim 1, wherein the a driving unit comprises:
   a wheel motor for providing power by electric power received from the battery; and
   a wheel coupled to a driving shaft of the wheel motor to rotate.

3. The radio-controlled seed planter according to claim 1, wherein the seeding unit comprises:
   a front frame joined to a rear of the RC truck;
   side frames formed on both sides of the front frame;
   a plurality of seeding modules installed at predetermined intervals on connecting rods installed between the two side frames;
   a driving means installed on a side frame to drive the seeding modules; and
   a compaction roller installed behind the side frames to compact ridges where seeds are sown by the seeding modules and provided on one side thereof with an encoder for detecting a number of revolutions thereof.

4. The radio-controlled seed planter according to claim 3, wherein the seeding module comprises:
   a mounting part through which the connecting rods penetrate;
   a hopper installed above the mounting part to store seeds for sowing;
   a seeding roller rotatably installed inside the hopper and having seed discharge grooves formed radially on an outer peripheral surface thereof to discharge seeds;
   a roller sprocket installed at an outer end of a rotating shaft of the seeding roller and adapted to receive power via the driving means to rotate the seeding roller;
   plows installed under the mounting part in a manner of descending and ascending to form seeding grooves in an upper surface of the ridges; and
   a soil covering and compaction means mounted resiliently behind the plows to cover seeds dropped into the seeding grooves by the seeding roller with soil.

5. The radio-controlled seed planter according to claim 4, wherein the seeding roller is made of electrically conductive synthetic resin such that static electricity generated by friction is discharged to a ground via the rotating shaft, the mounting part and the plows, which are made of metal.

6. The radio-controlled seed planter according to claim 5, wherein the seeding roller further comprises a means for detecting discharge of static electricity provided on one side thereof and wherein the means for detecting discharge of static electricity detects whether or not static electricity generated on the seeding roller is discharged and provides a detected signal to the remote control module such that the detected signal is transmitted to the radio control unit.

7. The radio-controlled seed planter according to claim 4, further comprising a vibration means for generating vibration, the vibration means being provided on one side of the hopper.

8. The radio-controlled seed planter according to claim 7, wherein the vibration means comprises a vibration motor provided on one side of the rotating shaft of the seeding roller to cause the seeding roller to vibrate.

9. The radio-controlled seed planter according to claim 7, wherein the vibration means comprises:
   a rotating shaft installed inside the hopper with both ends rotatably mounted on both side walls of the hopper;
   an actuating bar to be raised and lowered by rotation of the seeding roller by configuring such that one end of the actuating bar is fixedly mounted on an outer end of a rotating shaft and another end of the actuating bar is provided with a sliding roller to be inserted into a tooth groove of the roller sprocket mounted on the outer end of the rotating shaft of the seeding roller; and
   a vibration plate installed inside the hopper with one end fixedly mounted on the rotating shaft to shake seeds stored in the hopper up and down by means of reciprocation and rotation at a predetermined angle of the rotating shaft, which is caused by the actuating bar.

10. The radio-controlled seed planter according to claim 3, wherein the driving means comprises:

a driving motor installed on one side of the side frame to drive in conjunction with the number of revolutions of the compaction roller, which is detected by the encoder;

a driving sprocket mounted on a driving shaft of the driving motor;

a power transmission shaft installed between the side frames to transmit power to the seeding modules;

a driven sprocket installed at an opposite side of the power transmission shaft; and a roller chain connected between the driving sprocket and the driven sprocket to transmit power to the driven sprocket.

11. The radio-controlled seed planter according to claim 1, wherein the driving units further comprise caterpillar treads connected between front and rear wheels installed on front and rear sides on both sides of the subframe.

12. The radio-controlled seed planter according to claim 1, wherein the RC truck further comprises a camera unit for providing the radio control unit with image data obtained by photographing surroundings.

13. The radio-controlled seed planter according to claim 1, wherein the RC truck further comprises a GPS unit for receiving signals from GPS satellites and providing a current position to the radio control unit.

* * * * *